United States Patent
Hyndman

(10) Patent No.: US 12,445,495 B2
(45) Date of Patent: Oct. 14, 2025

(54) SECURE INFRASTRUCTURE AS CODE (IAC) SOLUTION FOR DEPLOYING CLOUD RESOURCES

(71) Applicant: INTERNATIONAL BUSINESS MACHINES CORPORATION, Armonk, NY (US)

(72) Inventor: Arn Hyndman, Ottawa (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 304 days.

(21) Appl. No.: 18/190,368

(22) Filed: Mar. 27, 2023

(65) Prior Publication Data
US 2024/0333769 A1   Oct. 3, 2024

(51) Int. Cl.
*H04L 9/40* (2022.01)

(52) U.S. Cl.
CPC .................... *H04L 63/20* (2013.01)

(58) Field of Classification Search
CPC ....................................... H04L 63/20
USPC ............................................. 726/1
See application file for complete search history.

(56) References Cited

U.S. PATENT DOCUMENTS

| | | | |
|---|---|---|---|
| 10,872,029 B1 | 12/2020 | Bawcom | |
| 11,556,238 B1* | 1/2023 | Kairali | G06F 9/451 |
| 2022/0407687 A1 | 12/2022 | Chu | |
| 2023/0186117 A1* | 6/2023 | Durvasula | G06N 3/09 706/12 |
| 2023/0300129 A1* | 9/2023 | Hojjati | H04L 63/0876 726/4 |

FOREIGN PATENT DOCUMENTS

| | | | |
|---|---|---|---|
| CN | 111353178 A | 6/2020 | |
| WO | WO-2019067747 A1 * | 4/2019 | G06F 21/105 |

OTHER PUBLICATIONS

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

(Continued)

*Primary Examiner* — Aubrey H Wyszynski
(74) *Attorney, Agent, or Firm* — Konrad, Raynes, Davda & Victor, LLP; Janaki K. Davda

(57) ABSTRACT

Provided are techniques for a secure IaC solution for deploying cloud resources. A signed Infrastructure as Code (IaC) solution is received. A policy check is performed to determine that the signed IaC solution conforms to one or more policies. An automated validation of the signed IaC solution is performed to check for one or more compliance or security issues. A signature check of the signed IaC solution is performed to determine that the signed IaC solution has not been tampered with. It is determined that the signed IaC solution is authorized to be deployed by checking a trusted profile. The signed IaC solution is executed to deploy cloud resources.

20 Claims, 9 Drawing Sheets

(56) References Cited

OTHER PUBLICATIONS

"Digital signature", Wikipedia, 14 pp., [online][retrieved Mar. 20, 2023] https://en.wikipedia.org/wiki/Digital_signature.
Saibotsivad, "Signed tar", github, Mar. 23, 2015, 5 pp. [online] [retrieved Mar. 20, 2023,]https://github.com/saibotsivad/signed-tar.
"Cloud Resource Names", IBM Corporation, IBM Cloud Docs, 7 pp.[online][retrieved Mar. 20, 2023] https://cloud.ibm.com/docs/account?topic=account-crn.

\* cited by examiner

SECURE INFRASTRUCTURE AS CODE (IAC) SOLUTION FOR DEPLOYING CLOUD RESOURCES

BACKGROUND

Embodiments of the invention relate to a secure Infrastructure as Code (IaC) solution for deploying cloud resources.

Large enterprises operating cloud infrastructure and deploying cloud applications face a barrage of threats and are subject to a large number of compliance regulations intended to mitigate these threats. This leads to development and operation costs as many tasks are manual.

Leveraging Infrastructure as Code (IaC) may be described as using definition files to automate the process of provisioning and managing computing infrastructure. The development and operation costs may be reduced by leveraging IaC to create repeatable secure and compliant infrastructure solutions that may be used for many applications.

SUMMARY

In accordance with certain embodiments, a computer-implemented method comprising operations is provided for a secure IaC solution for deploying cloud resources. In such embodiments, a signed Infrastructure as Code (IaC) solution is received. A policy check is performed to determine that the signed IaC solution conforms to one or more policies. An automated validation of the signed IaC solution is performed to check for one or more compliance or security issues. A signature check of the signed IaC solution is performed to determine that the signed IaC solution has not been tampered with. It is determined that the signed IaC solution is authorized to be deployed by checking a trusted profile. The signed IaC solution is executed to deploy cloud resources.

In accordance with other embodiments, a computer program product comprises a computer readable storage medium having program code embodied therewith, the program code executable by at least one processor to perform operations for a secure IaC solution for deploying cloud resources. In such embodiments, a signed Infrastructure as Code (IaC) solution is received. A policy check is performed to determine that the signed IaC solution conforms to one or more policies. An automated validation of the signed IaC solution is performed to check for one or more compliance or security issues. A signature check of the signed IaC solution is performed to determine that the signed IaC solution has not been tampered with. It is determined that the signed IaC solution is authorized to be deployed by checking a trusted profile. The signed IaC solution is executed to deploy cloud resources.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for a secure IaC solution for deploying cloud resources. In such embodiments, a signed Infrastructure as Code (IaC) solution is received. A policy check is performed to determine that the signed IaC solution conforms to one or more policies. An automated validation of the signed IaC solution is performed to check for one or more compliance or security issues. A signature check of the signed IaC solution is performed to determine that the signed IaC solution has not been tampered with. It is determined that the signed IaC solution is authorized to be deployed by checking a trusted profile. The signed IaC solution is executed to deploy cloud resources.

These embodiments advantageously perform a policy check, an automated validation, a signature check, and an authorization determination to ensure that cloud resources are deployed using verified IaC solutions and not via a manual process. Embodiments also advantageously ensure that the IaC solution isn't tampered with (e.g., with the signature check) and remains secure and compliant (e.g., with the policy check).

In additional embodiments, the signed IaC solution is from a group comprising: a signed public IaC solution, a signed private IaC solution, and a signed combined IaC solution. This advantageously allows execution of a signed public IaC solution, a signed private IaC solution or a signed combined IaC solution (which has public and private components).

In yet additional embodiments, a signed public IaC solution is received, an automated validation of the signed public IaC solution is performed, a signature check of the signed public IaC solution is performed, and, in response to the signed public IaC solution being approved based on the automated validation and the signature check, the signed public IaC solution is stored as an approved IaC solution in a public catalog. This advantageously ensures that a signed public IaC solution is verified before being stored as an approved IaC solution in the public catalog.

In other embodiments, a signed private IaC solution is received, an automated validation of the signed private IaC solution is performed, a signature check of the signed private IaC solution is performed, and, in response to the signed private IaC solution being approved based on the automated validation and the signature check, the signed private IaC solution is stored as an approved IaC solution in a private catalog. This advantageously ensures that a signed private IaC solution is verified before being stored as an approved IaC solution in the private catalog.

In yet other embodiments, configuration parameters are retrieved, wherein the signed IaC solution is executed using the configuration parameters. This advantageously allows use of configuration parameters for executing the signed IaC solution.

In further embodiments, a plurality of approved IaC solutions are displayed, a selection of an approved IaC solution from the plurality of approved IaC solutions is received, authorization to execute the selected, approved IaC solution is received, and the selected, approved IaC solution is executed to deploy new cloud resources. This advantageously allows selection of an approved IaC solution from the public catalog or the private catalog, which is than determined to be authorized before execution.

In further embodiments, a public catalog, a private catalog, a secure deployment agent, and a target account form a secure IaC solution pipeline. This advantageously creates an efficient pipeline for executing the signed IaC solution.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Deploying infrastructure may be described as obtaining services and storage from the cloud infrastructure (e.g., for a particular enterprise customer). Embodiments ensure that infrastructure is deployed using approved IaC solutions and not via a manual process. Embodiments also ensure that the IaC solution isn't tampered with and remains secure and compliant.

Figure 1:
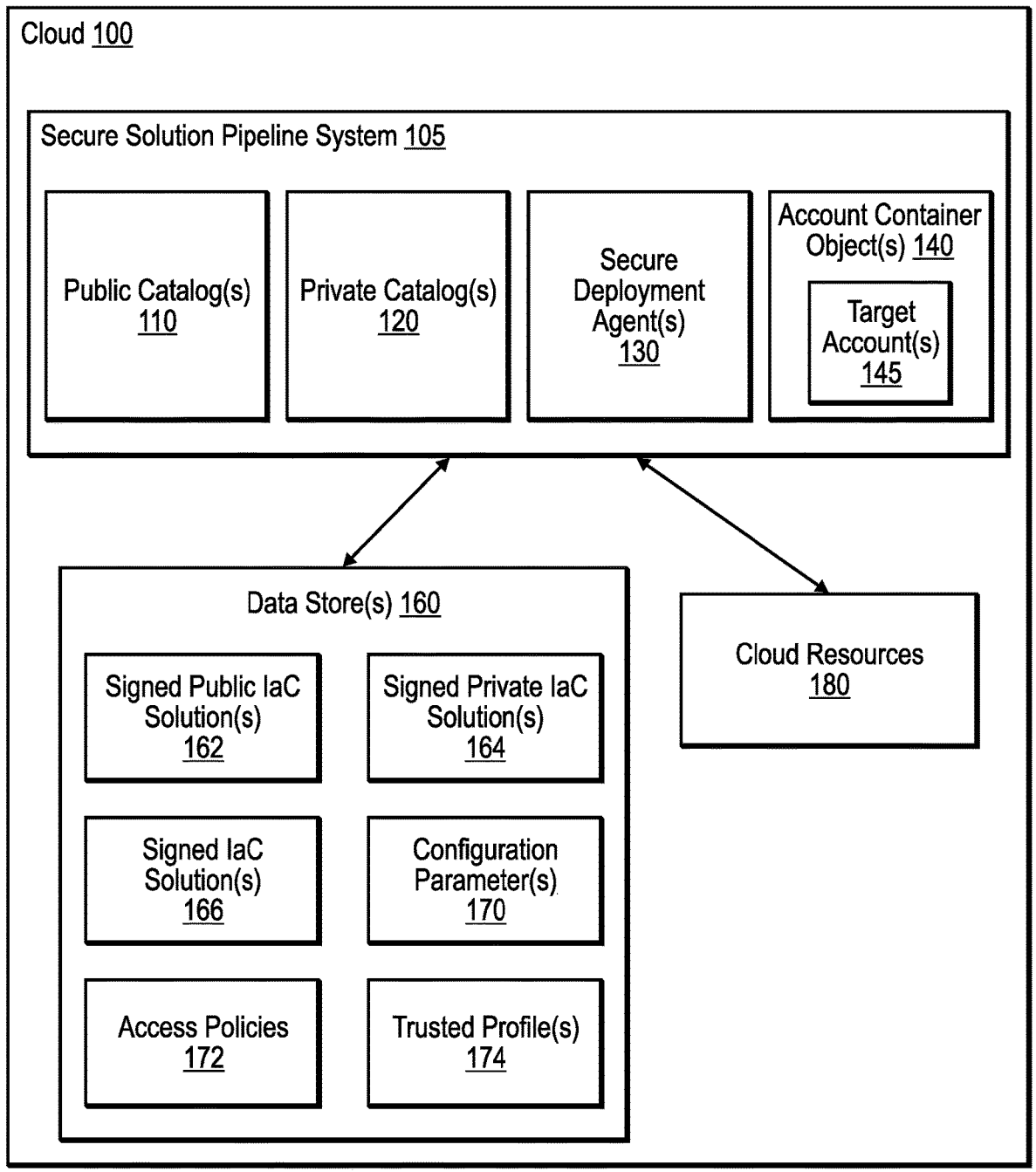
FIG. 1 illustrates, in a block diagram, a computing environment in accordance with certain embodiments.

FIG. 1 illustrates, in a block diagram, a computing environment in accordance with certain embodiments. In FIG. 1, a cloud 100 includes a secure solution pipeline system 105, one or more data stores 160, and cloud resources 180.

The secure solution pipeline system 105 includes one or more public catalogs 110, one or more private catalogs 120, one or more secure deployment agents 130 (also referred to as "projects" or "instances of secure deployment agents"), and one or more account container objects 140. An account container object 140 (e.g., an enterprise account) includes one or more target accounts 145. In various embodiments, there may be any number of public catalogs 110, private catalogs 120, secure deployment agents 130, and account container objects 140. In certain embodiments, the public catalog 110, the private catalog 120, the secure deployment agent 130, and the account container object 140 are located in the cloud 100 across a number of networked computing devices.

The one or more data stores 160 hold (or store) one or more signed public IaC solutions 162, one or more signed private IaC solutions 164, one or more signed IaC solutions 166 (which may include public and/or private signed IaC solutions and may be referred to as a "signed combined IaC solution" when both public and private signed IaC solutions are included), configuration parameters 170, one or more access policies 172, and one or more trusted profiles 174. The cloud resources 180 include cloud infrastructure, such as cloud services and cloud storage.

A trusted profile 174 is associated with the secure deployment agent 130 and indicates which entities may deploy the cloud resources 182 for a target account. The trusted profile 174 may be modified to easily change which entities may deploy cloud resources.

In certain embodiments, a trusted profile 174 is bound or attached to a secure deployment agent instance based on the identity of the secure deployment agent instance. That is, an access policy is bound to the secure deployment agent identity.

With embodiments, there are many secure deployment agent instances, and a customer specifies a unique secure deployment agent instance that is to deploy resources by binding that secure deployment agent instance to the trusted profile 174.

In certain embodiments, an access policy 172 is attached to the trusted profile 174 (either directly or indirectly via access groups), and then the trusted profile 174 is attached to the secure deployment agent instance. The binding or attachment may be deleted, and the access policy 172 associated with the trusted profile 174 may be edited. In such embodiments, the access policy 172 for the secure deployment agent may be flexibly modified.

Thus, with embodiments, the secure deployment agent (identity) does not need to be located inside of or belong to the target account or even the account container. Also, with embodiments, the binding is to the secure deployment agent identity and not to a user or service identifier under control of the customer.

In certain embodiments, the cloud provider that provides the secure deployment agent may be able to acquire the identity token for the secure deployment agent. This is accomplished by exchanging a generic cloud provider secure deployment agent service identity token for a specific instance identity token that is bound to the trusted profile 174.

The public catalog 110 processes the signed public IaC solutions 162. The private catalog 120 processes the signed private IaC solutions 164. The secure deployment agent 130 processes the signed IaC solutions 166 and deploys the cloud infrastructure for a target account. A target account uses a trusted profile 174 associated with the secure deployment agent 130 to limit deployment to specified entities associated with the secure deployment agent 130.

The secure solution pipeline system 105 ensures that human users do not deploy infrastructure within an enterprise's cloud, except via IaC and via the secure deployment agent 130, even across the many accounts an enterprise may have. The secure solution pipeline system 105 also creates a secure IaC solution pipeline ensuring the providence and validation of each IaC. In certain embodiments, the providence is maintained based on the crypto signature. For example, a signed IaC solution is onboarded to a catalog, and that signature is validated and also used to ensure that the IaC isn't tampered with. The onboarding does not complete until the automated and manual checks and approvals are successful.

In certain embodiments, an enterprise's use of cloud is contained within an account container object 140 (e.g., an enterprise account). Account creation policy may be set such that users may not create sub-accounts directly, but rather via the secure deployment agent 130 (which may be described as an authorized platform service).

At the account container object level, a second policy is set such that contained target accounts may view approved IaC solutions provided in a private catalog and "raw" cloud services are not available. These IaC solutions include IaC solutions for account creation and IaC solutions for deploying cloud infrastructure.

The secure solution pipeline system 105 introduces a new cloud platform capability referred to as secure deployment agent 130. The secure deployment agent 130 deploys IaC solutions and has its own identity within the cloud Identity and Access Management (IAM) model. A secure deployment agent 130 enforces policy such that approved IaC solutions from the public catalog or the private catalog are permitted to be deployed in an enterprise. The secure deployment agent 130 also enforces policy such that IaC solutions that are not approved are not permitted to be deployed in the enterprise.

With embodiments, any inputs (i.e., configuration parameters) for the IaC solutions are also subject to automated validation and approval processes.

Figure 2:
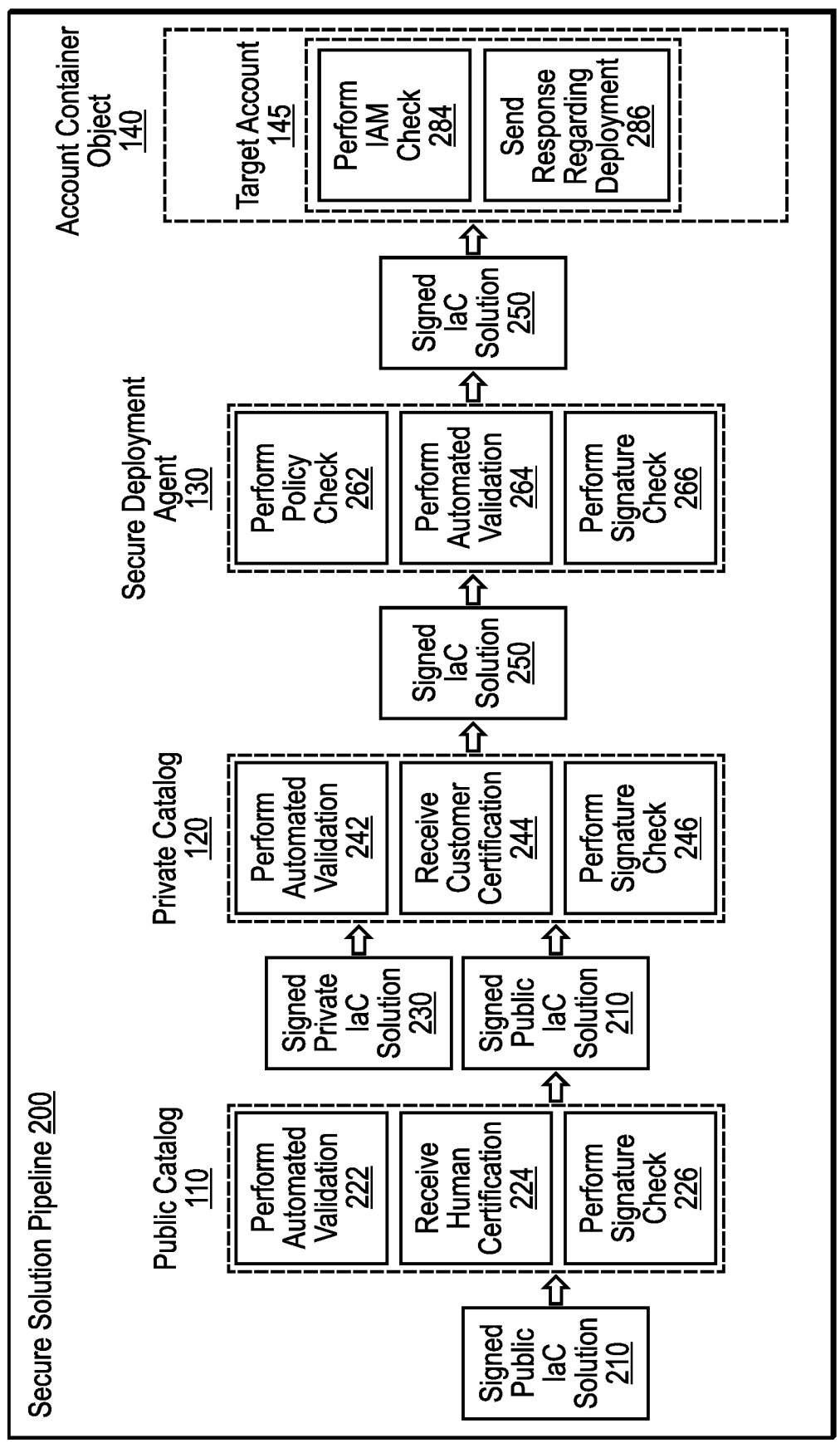
FIG. 2 illustrates a secure solution pipeline in accordance with certain embodiments.

FIG. 2 illustrates a secure solution pipeline in accordance with certain embodiments. In FIG. 2, initially, a public catalog 110 receives a signed public IaC solution 210. The public catalog 110 performs automated validation 222 of the signed public IaC solution 210, receives human (i.e., user) certification 224 that the signed public IaC solution 210 is correct, and performs a signature check 226. If there are no problems with the signed public IaC solution 210, the public catalog sends the signed public IaC solution 210 to the private catalog. In certain embodiments, the public catalog 110 includes extra checks, such an author background check.

In certain embodiments, automated validation scans the signed public IaC solution 210 to look for known compliance or security issues: with the signed public IaC solution 210 and with the resources and the resource configuration the signed public IaC solution 210 is to deploy.

In certain embodiments, the public catalog 110 enforces that a human pressed a button indicating the human has reviewed and approve the signed public IaC solution 210. This ensures the safety of the signed public IaC solution 210 and also provides traceability back to the responsible approver.

The signature check is based on digital signatures, such as a signed tar file. The signature check verifies: (1) that the file hasn't been tampered with since it was signed and (2) who signed it (so that someone unexpected can't introduce or change the signed public IaC solution 210).

In certain embodiments, the author background check looks at the signature of the signed public IaC solution 210, the information the person onboarding the signed public IaC solution 210 provided, and then attempts to confirm that the person exists in the company the person claims to work for and that the person is supposed to be onboarding this signed public IaC solution 210.

The private catalog 120 also receives a signed private IaC solution 230. The private catalog 120 performs automated validation 242, receives customer (or other user) certification 244 that the signed private IaC solution 230 is correct, and performs a signature check 246. If there are no problems with the signed private IaC solution 230, the private catalog 120 combines the signed public IaC solution 210 and the signed private IaC solution 230 to generate the signed IaC solution 250 and sends the signed IaC solution 250 to the secure deployment agent 130. In various embodiments, the signed IaC solution 250 may include one or both of the signed public IaC solution 210 and the signed private IaC solution 230. In certain embodiments, the private catalog 120 checks signatures and origin of the private IaC solution 230, without checking the public IaC solution 210 as the public catalog 110 handles the signed public IaC solution 210. The private catalog 120 may also perform automated validation by running a code risk check and a security and compliance check. The code risk check analyses the signed private IaC solution code to look for known security and compliance problems, while the security and compliance check scans deployed resources to look for known security and compliance problems. With embodiments, the private catalog 120 generates a test deployment of the signed private IaC solution 230 is performed, and then the private catalog 120 initiates the security and compliance scan of the resulting deployment.

In certain embodiments, automated validation scans the signed private IaC solution 230 to look for known compliance or security issues: with the signed private IaC solution 230 and with the resources and the resource configuration the signed private IaC solution 230 is to deploy.

In certain embodiments, the private catalog 120 enforces that a human (i.e., customer or other user) pressed a button indicating the human has reviewed and approve the signed private IaC solution 230. This ensures the safety of the signed private IaC solution 230 and also provides traceability back to the responsible approver.

The signature check is based on digital signatures, such as a signed tar file. The signature check verifies: (1) that the file hasn't been tampered with since it was signed and (2) who signed it (so that someone unexpected can't introduce or change the signed private IaC solution 230).

The secure deployment agent 130 performs policy checks 262, performs automated validation 264, and performs a signature check 266. In certain embodiments, the secure deployment agent 130 receives configuration parameters, which are validated (e.g., if a cluster is to be deployed, the configuration parameter indicates how many nodes are to be in the cluster). In certain embodiments, the secure deployment agent 130 ensures that IaC solutions that align with one or more policies are deployed (i.e., any IaC solution, which may be from the public catalog 110, the private catalog 120, or a combination of the public catalog 110 and the private catalog 120). The secure deployment agent 130 also checks the signature and runs CRA & SCC checks during deployment. If there are no problems with the signed IaC solution 250, the secure deployment agent 130 sends the signed IaC solution 250 to the account container object 140 to be executed with the configuration parameters. Execution of the signed IaC solution 250 results in deploying cloud resources.

In certain embodiments, the secure deployment agent 130 checks to make sure the signed IaC solution 250 came from an approved public or private catalog (a first policy check) and that the user is permitted to use the secure deployment agent 130 (second policy check). Then, the secure deployment agent 130 performs automated validations that were done previously during public and private catalog onboarding, but now with the specific input parameters including which target account it will be deployed to (which may change the compliance and security of the signed IaC solution 250).

In certain embodiments, automated validation scans the signed IaC solution 250 to look for known compliance or security issues: with the signed IaC solution 250 and with the resources and the resource configuration the signed IaC solution 250 is to deploy.

In certain embodiments, the secure deployment agent 130 enforces that a human pressed a button indicating the human has reviewed and approve the signed IaC solution 250. This ensures the safety of the signed IaC solution 250 and also provides traceability back to the responsible approver.

In certain embodiments, the secure deployment agent 130 doesn't change the signed IaC solution 250, but the secure deployment agent 130 manages the input configuration and provides the authorization to deploy the signed IaC solution 250 via the trusted profile binding.

In certain embodiments, a cloud IAM system performs an IAM check 284 by checking a trusted profile to determine whether the secure deployment agent 130 is authorized to deploy the signed IaC solution 250. That is, the IAM check 284 verifies that the instance of the secure deployment agent 130 has a policy (via the binding to the trusted profile 174) that allows the secure deployment agent 130 to deploy the signed IaC solution 250. With embodiments, the cloud IAM system check is made in the context of the target account 145 using policies from the target account 145. Based on the cloud IAM system check, a response (i.e., a message) regarding deployment 286 is sent to the secure deployment agent 130.

If so, the target account 145 sends the secure deployment agent 130 a response that the secure deployment agent 130 is authorized to deploy the cloud resources, otherwise, the target account 145 sends the secure deployment agent 130 a response that the secure deployment agent 130 does not have the permissions for deploying the signed IaC solution 250. If the secure deployment agent 130 is authorized, the secure deployment agent 130 deploys the cloud resources by executing the signed IaC solution 250.

In certain embodiments, the cloud IAM system ensures that the authorized party (in this example, the secure deployment agent 130) may deploy the signed IaC solution 250. In addition, the target account 145 uses policy to prevent direct deployment via terraform, an Application Programming Interface (API), a User Interface (UI), etc.

Figure 3:
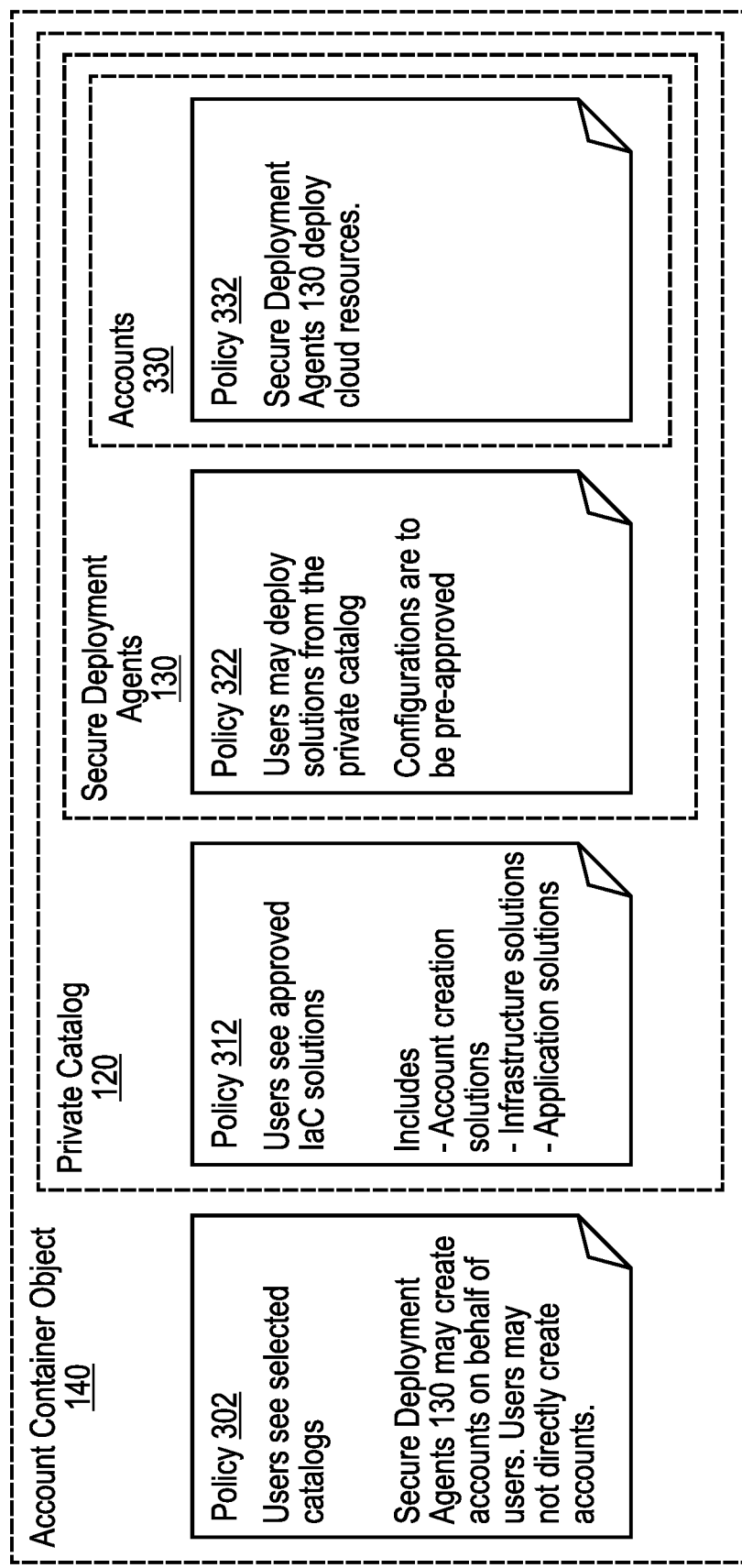
FIG. 3 illustrates example policies associated with entities of the secure solution pipeline in accordance with certain embodiments.

FIG. 3 illustrates example policies associated with entities of the secure solution pipeline 105 in accordance with certain embodiments. In this example, the account container object 140 has a policy 302 that indicates that users see selected catalogs (e.g., in a user interface). The policy 302 also indicates that secure deployment agents 130 may create accounts on behalf of users, while users may not directly create accounts.

The private catalog 120 has a policy 312 that indicates that users see approved IaC solutions (e.g., in the user interface). Examples of approved IaC solutions include: account creation solutions, infrastructure solutions, and application solutions.

The secure deployment agents 130 have a policy 322 that indicates that users may deploy IaC solutions from the private catalog and that configurations are to be pre-approved. In certain embodiments, IAM policies are used to control which public and private catalogs and which IaC solutions within those public and private catalogs may be used by whom. In certain embodiments, the administrator of the account containing the public or private catalog sets the policy and also sets policy on who can access particular secure deployment agent instances.

The accounts 330 have a policy 332 that indicates that the secure deployment agents 130 deploy cloud resources. Examples of cloud resources are services (e.g., a virtual server) and physical computing devices or storage (e.g., nodes for a cluster).

In certain embodiments, a user selects an account creation solution from the public catalog or the private catalog and deploys the account creation solution via the secure deployment agent. This creates a new account that is pre-configured such that a secure deployment agent (e.g., an instance of the secure deployment agent) is permitted to deploy cloud resources, while human users are not permitted to deploy the cloud resources (e.g., even the nominal account "owner" who has an IAM policy that allows cloud resource creation is not allowed to deploy the cloud resources). This is accomplished by establishing a trust relationship between the IAM identity of the secure deployment agent and the target account. In certain embodiments, the trusted profile is associated with a Cloud Resource Name (CRN) service identity in the cloud. The trusted secure deployment agent (via the trusted profile in the Cloud) is granted IAM permissions to create and modify cloud resources, which are then deployed.

The chain from enterprise policy, to private catalog, to secure deployment agent, to account ensures that each of the accounts created within the enterprise has IaC solutions deployed from a permitted private catalog. In addition, the secure solution pipeline system 105 ensures that the IaC solution in the private catalog is approved, secure, and compliant with the policies.

In certain embodiments, when an IaC solution is created, the secure deployment agent packages up and cryptographically signs the package. This is to ensure that the IaC solution is not changed afterwards and provides traceability back to the author. With embodiments, there are any number of IaC solution versions.

In certain embodiments, the signed IaC solution package is onboarded to a public catalog or a private catalog. The onboarding process includes automated validation of compliance and security (CRA, SCC, vulnerability scan, etc.), signature validation, and confirmation of human review.

In certain embodiments, the secure deployment agents cloud platform capability ensures that IaC solutions from the public catalog or the private catalog are permitted to be used. The secure deployment agent is responsible for capturing solution inputs and performing automated validation (including signature check, security checks, and compliance checks) on the IaC solution configured for this secure deployment agent. In certain embodiments, the secure deployment agent ensures a human review passes before allowing deployment of the configured solution to a target account.

In certain embodiments, the cloud account into which the IaC solution is deployed (the target account) ensures that IaC solutions from the permitted secure deployment agent are deployed using the trusted profile.

In certain embodiments, the secure IaC solution pipeline ensures that the IaC solutions that may be deployed have passed automated and, optionally, manual checks and that there are no opportunities to tamper with the IaC solution or bypass the checks along the way.

Figure 4A:
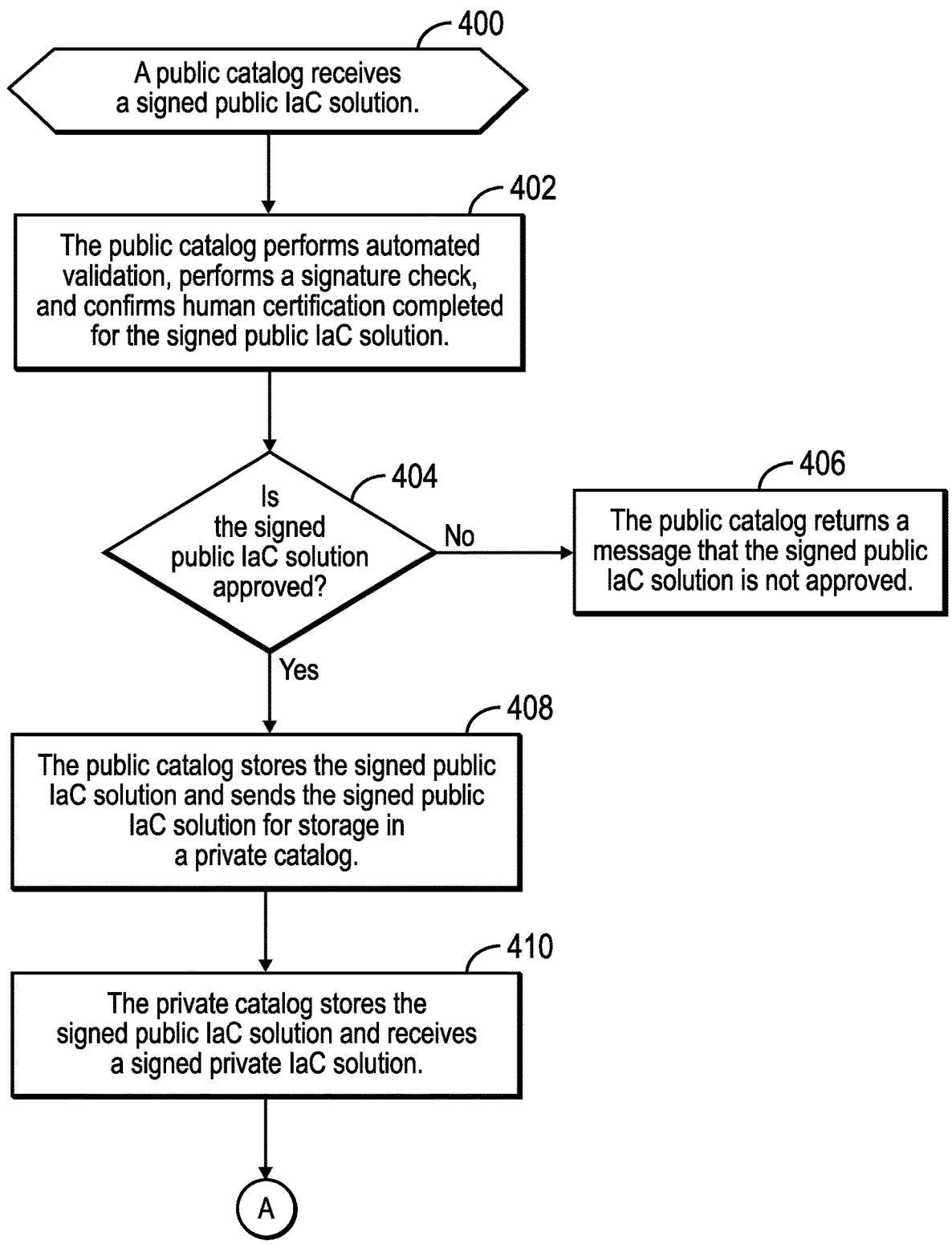
FIGS. 4A, 4B, and 4C illustrate, in a flowchart, operations for a secure IaC solution pipeline for deploying cloud resources in accordance with certain embodiments.
Figure 4B:
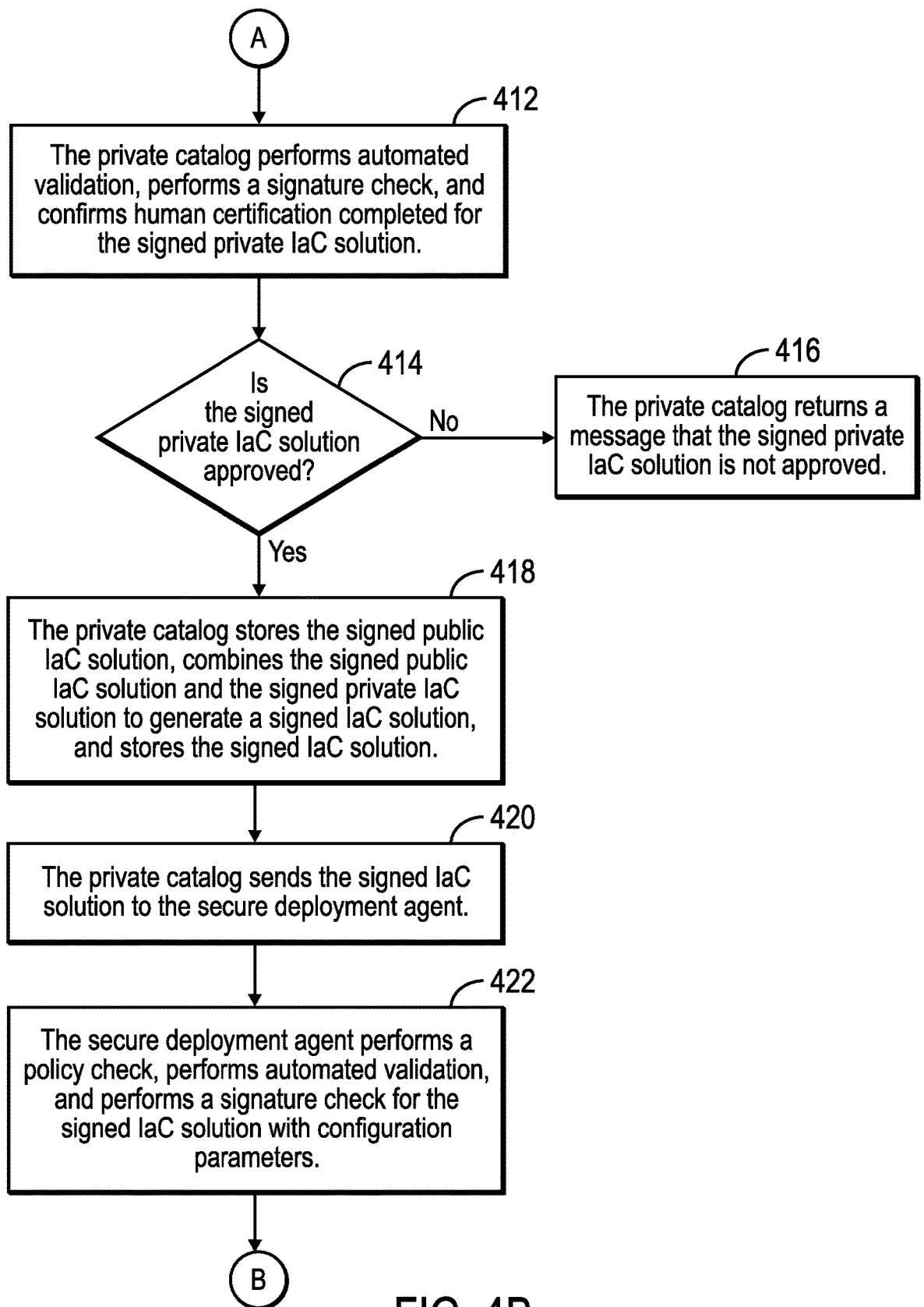
Figure 4C:
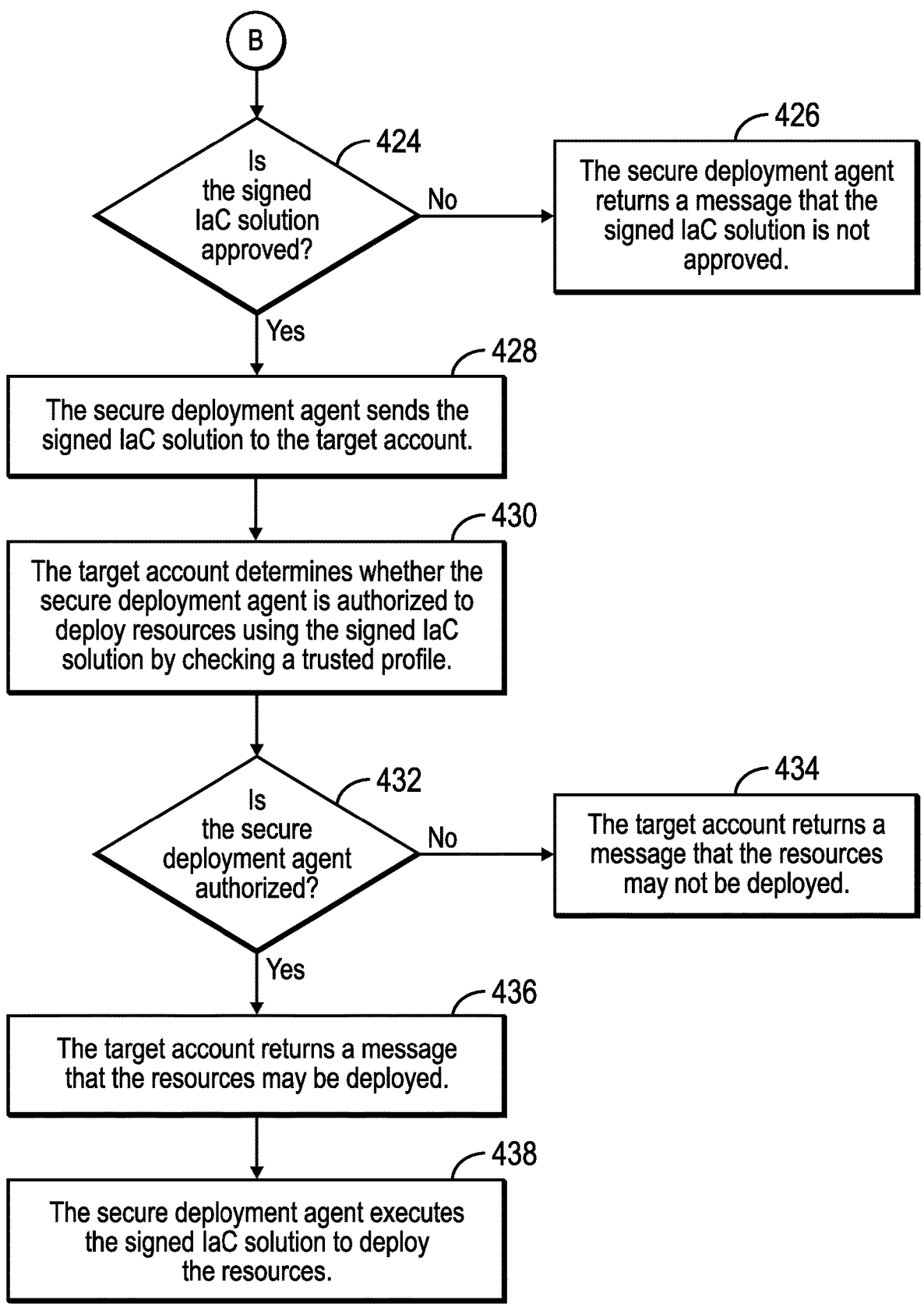

FIGS. 4A, 4B, and 4C illustrate, in a flowchart, operations for a secure IaC solution pipeline for deploying cloud resources in accordance with certain embodiments. Control begins at block 400 with a public catalog of the secure solution pipeline system 105 receiving a signed public IaC solution. In block 402, the public catalog performs automated validation, performs a signature check, and confirms human (e.g., user) certification completed for the signed public IaC solution.

In block 404, the public catalog determines whether the signed public IaC solution is approved. This is based on the automated validation, signature check, and receipt of an indication that human (i.e., user) certification is completed. If so, processing continues to block 408, otherwise, processing continues to block 406.

In block 406, the public catalog returns a message that the signed public IaC solution is not approved.

In block 408, the public catalog stores the signed public IaC solution (as an approved, signed public IaC solution or "approved IaC solution") and sends the signed public IaC solution for storage to a private catalog of the secure solution pipeline system 105. In block 410, the private catalog stores the signed public IaC solution and receives a signed private IaC solution. From block 410 (FIG. 4A), processing continues to block 412 (FIG. 4B).

In block 412, the private catalog performs automated validation, performs a signature check, and confirms human (i.e., customer or other user) certification completed for the signed private IaC solution.

In block 414, the private catalog determines whether the signed private IaC solution is approved. This is based on the automated validation, signature check, and receipt of an indication that human certification is completed. If so, processing continues to block 418, otherwise, processing continues to block 416.

In block 416, the private catalog returns a message that the signed private IaC solution is not approved. In block 418, the private catalog stores the signed public IaC solution (as an approved, signed private IaC solution or "approved IaC solution"), combines the signed public IaC solution and the signed private IaC solution to generate a signed IaC solution (i.e., a "signed combined IaC solution"), and stores the signed IaC solution.

In block 420, the private catalog sends the signed IaC solution to the secure deployment agent of the secure solution pipeline system 105.

In block 422, the secure deployment agent performs a policy check, performs automated validation, and performs a signature check for the signed IaC solution with configuration parameters. From block 422 (FIG. 4B), processing continues to block 424 (FIG. 4C).

In block 424, the secure deployment agent determines whether the signed IaC solution is approved. This is based on the policy check, the automated validation, and the signature check. If so, processing continues to block 428, otherwise, processing continues to block 426.

In block 428, the secure deployment agent returns a message that the signed IaC solution is not approved.

In block 426, the secure deployment agent sends the signed IaC solution to the target account of the secure solution pipeline system 105.

In block 430 the target account determines whether the secure deployment agent is authorized to deploy resources using the signed IaC solution by checking a trusted profile. In block 432, if the secure deployment agent is authorized, processing continues to block 436, otherwise, processing continues to block 434.

In block 434, the target account returns a message that the resources will not be deployed. In block 436, the target account returns a message that the resources may be deployed.

In block 438, the secure deployment agent executes the signed IaC solution to deploy the resources.

Figure 5:
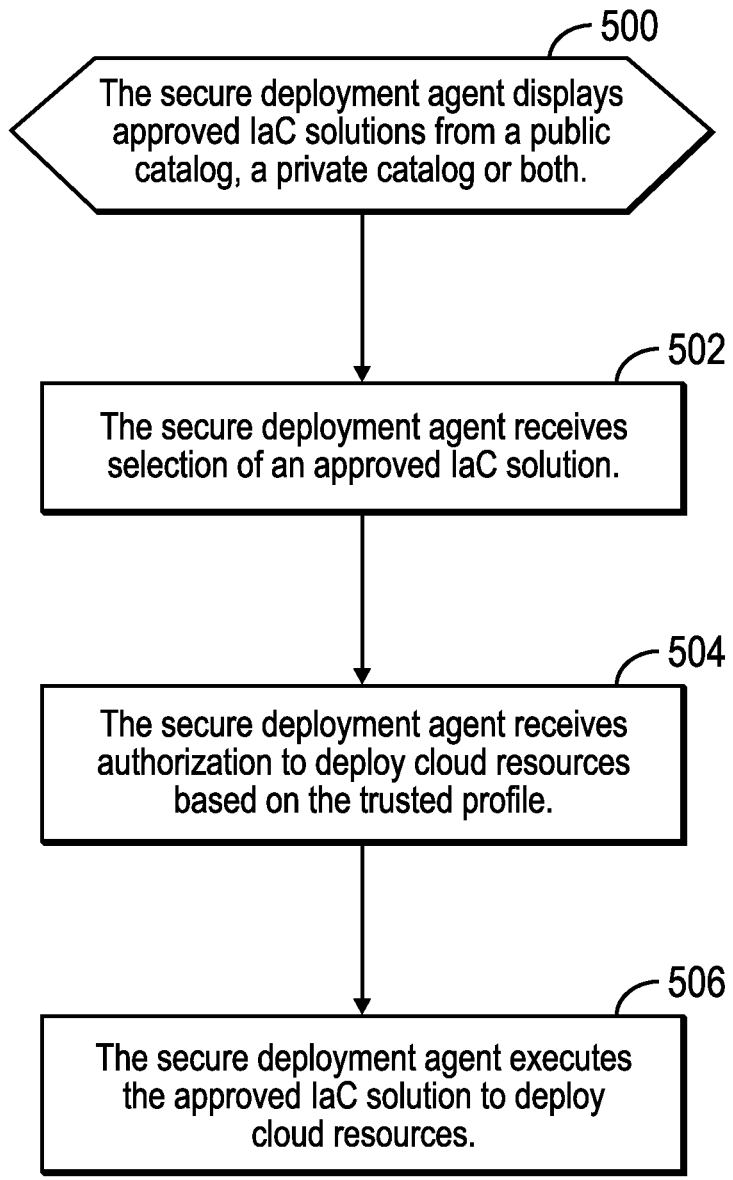
FIG. 5 illustrates, in a flowchart, operations for initiating deployment of cloud resources in accordance with certain embodiments.

FIG. 5 illustrates, in a flowchart, operations for initiating deployment of cloud resources in accordance with certain embodiments. Control begins at block 500 with the secure deployment agent of the secure solution pipeline system 105 displaying approved IaC solutions from a public catalog, a private catalog or both. An approved IaC solution may be described as one that passed the checks performed by the public catalog or the private catalog. In block 502, the secure deployment agent receives selection of an approved IaC solution. In block 504, the secure deployment agent receives authorization to execute the approved IaC solution to deploy cloud resources based on a trusted profile (e.g., via the operations of blocks 428-436). In block 506, the secure deployment agent executes the IaC solution to deploy cloud resources.

Figure 6:
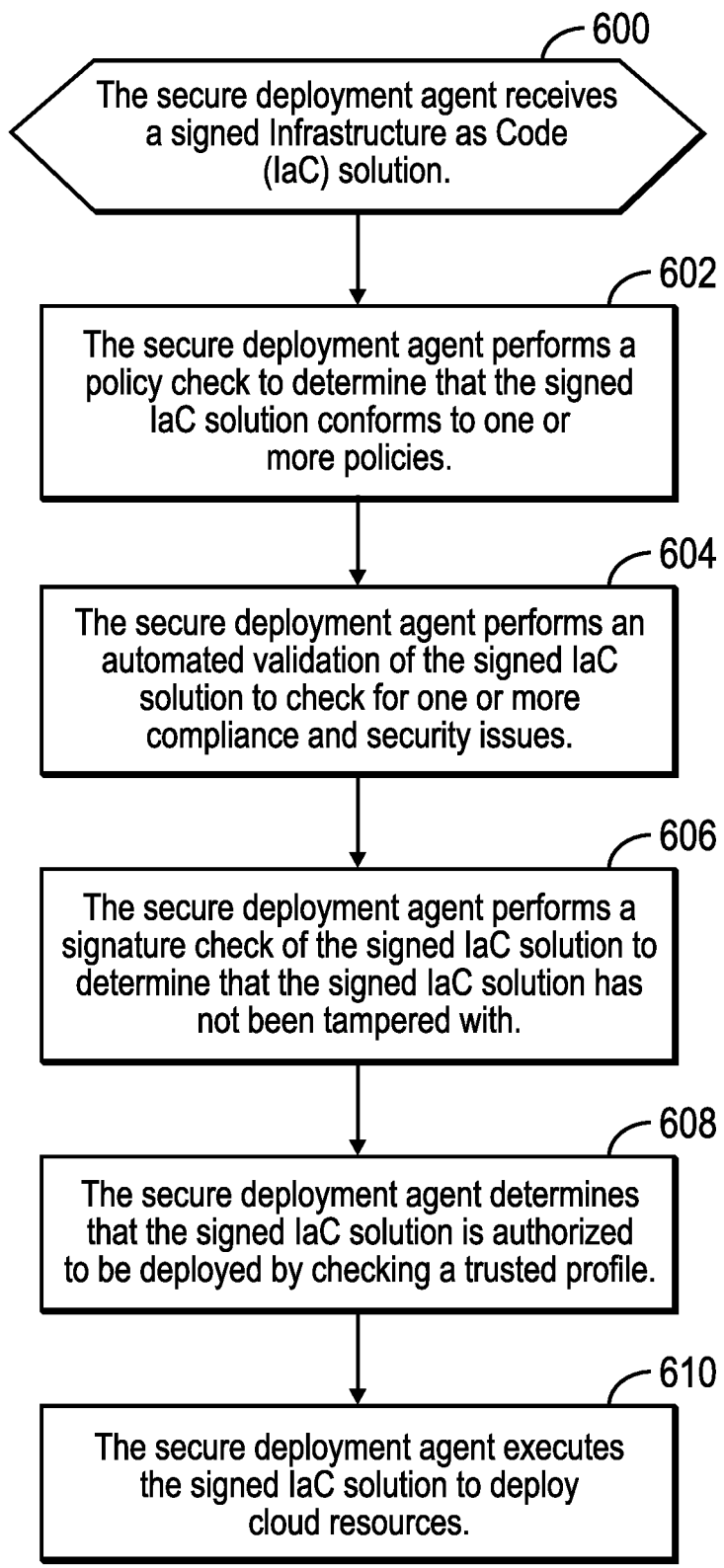
FIG. 6 illustrates, in a flowchart, operations for securely deploying cloud resources in accordance with certain embodiments.

FIG. 6 illustrates, in a flowchart, operations for securely deploying cloud resources in accordance with certain embodiments. Control begins at block 600 with the secure deployment agent 130 receiving a signed IaC solution. In block 602, the secure deployment agent 130 performs a policy check to determine that the signed IaC solution conforms to one or more policies. In block 604, the secure deployment agent 130 performs an automated validation of the signed IaC solution to check for one or more compliance and security issues. In block 606, the secure deployment agent 130 performs a signature check of the signed IaC solution to determine that the signed IaC solution has not been tampered with. In block 608, the secure deployment agent 130 determines that the signed IaC solution is authorized to be deployed by checking a trusted profile. In block 610, the secure deployment agent 130 executes the signed IaC solution to deploy cloud resources.

In certain embodiments, a secure solutions pipeline (also referred to as a supply chain) establishes an enterprise account (an example of an account container object 140), associated with a cloud, contained within an account container object, and managed using an account creation policy that prevents users from creating sub-accounts directly while enabling secure deployment agents to create accounts.

In certain embodiments, the secure solutions pipeline creates a second policy associated with the enterprise account to enable contained accounts to view approved IaC solutions advertised in a private catalog. The approved IaC solutions include ones for deploying cloud resources.

In certain embodiments, the secure solutions pipeline creates a new cloud platform capability in a form of the secure deployment agent, associated with a respective private catalog, used to deploy cloud resources and having an identity in a trusted profile and having an access management model associated with the cloud.

In certain embodiments, the secure solutions pipeline creates an enforcement policy associated with the secure deployment agent enabling approved IaC solutions from a catalog to be executed in an enterprise to deploy cloud resources.

In certain embodiments, in response to deploying the IaC solution, a new account that is pre-configured is created by the secure deployment agent and disables a user from further deploying cloud resources.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
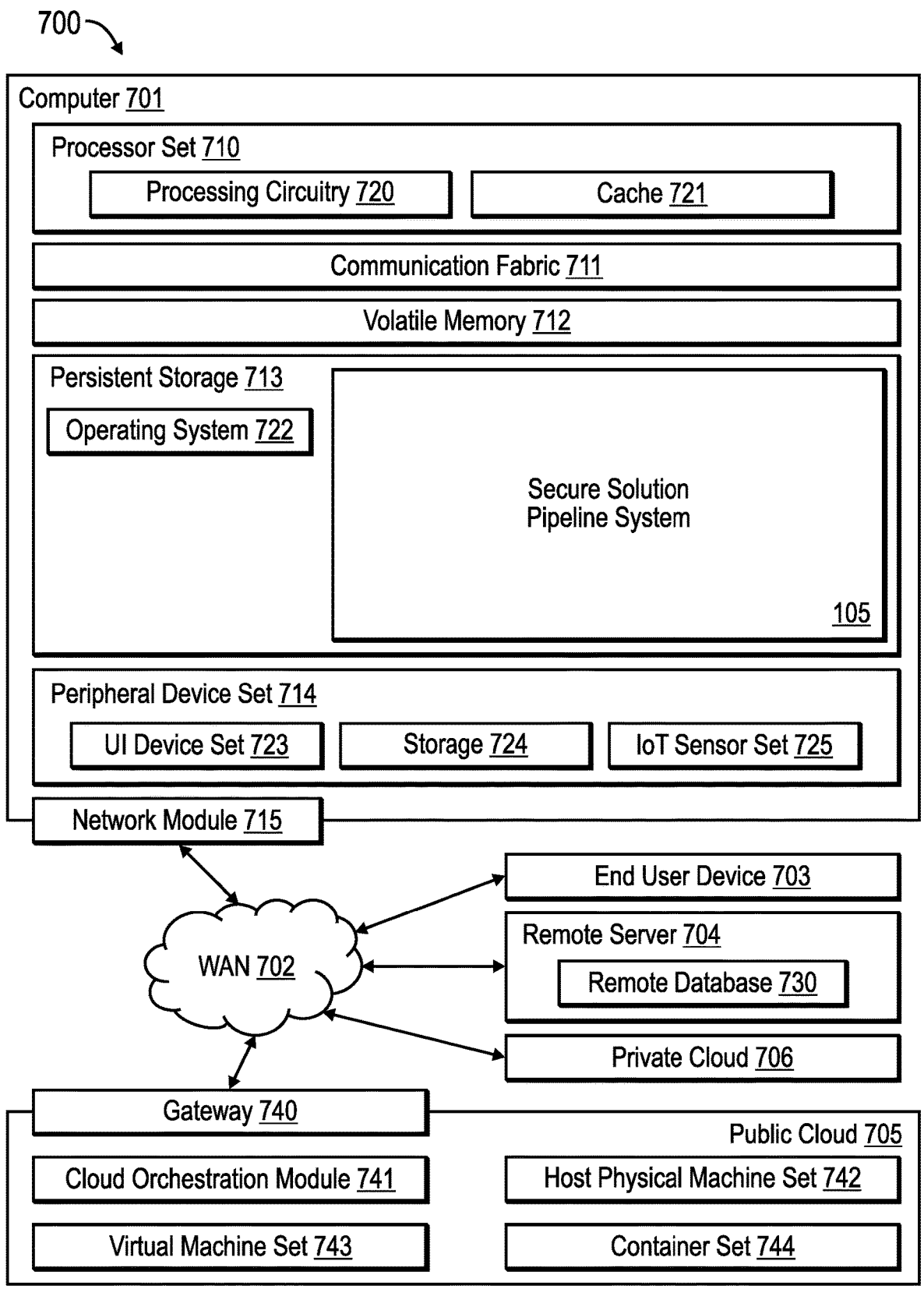
FIG. 7 illustrates a computing environment in accordance with certain embodiments.

FIG. 7 illustrates a computing environment 700 in accordance with certain embodiments. Computing environment 700 contains an example of an environment for the execution of at least some of the computer code involved in performing the inventive methods, such as a secure solution pipeline system 105. In addition to block 105, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 105, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 105 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 105 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

The foregoing description provides examples of embodiments of the invention, and variations and substitutions may be made in other embodiments. Several examples will now be provided to further clarify various aspects of the present disclosure:

Example 1: A computer-implemented method comprises receiving a signed Infrastructure as Code (IaC) solution. The computer-implemented method further comprises performing a policy check to determine that the signed IaC solution conforms to one or more policies. The computer-implemented method further comprises performing an automated validation of the signed IaC solution to check for one or more compliance or security issues. The computer-implemented method further comprises performing a signature check of the signed IaC solution to determine that the signed IaC solution has not been tampered with. The computer-implemented method further comprises determining that the signed IaC solution is authorized to be deployed by checking a trusted profile. The computer-implemented method further comprises executing the signed IaC solution to deploy cloud resources.

Example 2: The limitations of any of Examples 1 and 3-7, wherein the signed IaC solution is from a group comprising: a signed public IaC solution, a signed private IaC solution, and a signed combined IaC solution.

Example 3: The limitations of any of Examples 1-2 and 4-7, wherein the computer-implemented method further comprises receiving a signed public IaC solution. The computer-implemented method further comprises performing an automated validation of the signed public IaC solution. The computer-implemented method further comprises performing a signature check of the signed public IaC solution. In response to the signed public IaC solution being approved based on the automated validation and the signature check, the computer-implemented method further comprises storing the signed public IaC solution as an approved IaC solution in a public catalog.

Example 4: The limitations of any of Examples 1-3 and 5-7, wherein the computer-implemented method further comprises receiving a signed private IaC solution. The computer-implemented method further comprises performing an automated validation of the signed private IaC solution. The computer-implemented method further comprises performing a signature check of the signed private IaC solution. In response to the signed private IaC solution being approved based on the automated validation and the signature check, the computer-implemented method further comprises storing the signed private IaC solution as an approved IaC solution in a private catalog.

Example 5: The limitations of any of Examples 1~4 and 6-7, wherein the computer-implemented method further comprises retrieving configuration parameters, wherein the signed IaC solution is executed using the configuration parameters.

Example 6: The limitations of any of Examples 1-5 and 7, wherein the computer-implemented method further comprises displaying a plurality of approved IaC solutions. The computer-implemented method further comprises receiving selection of an approved IaC solution from the plurality of approved IaC solutions. The computer-implemented method further comprises receiving authorization to execute the selected, approved IaC solution. The computer-implemented method further comprises executing the selected, approved IaC solution to deploy new cloud resources.

Example 7: The limitations of any of Examples 1-6, wherein a public catalog, a private catalog, a secure deployment agent, and a target account form a secure IaC solution pipeline.

Example 8: A computer program product, the computer program product comprising a computer readable storage medium having program code embodied therewith, the program code executable by at least one processor to perform a method according to any one of Examples 1-7.

Example 9: A computer system comprising one or more processors, one or more computer-readable memories and one or more computer-readable, tangible storage devices, and program instructions, stored on at least one of the one or more computer-readable, tangible storage devices for execution by at least one of the one or more processors via at least one of the one or more computer-readable memories, to perform a method according to any of Examples 1-7.

What is claimed is:

1. A computer-implemented method, comprising operations for:
    receiving a signed Infrastructure as Code (IaC) solution, wherein the signed IaC solution is selected from a group consisting of a signed public IaC solution, a signed private IaC solution, and a signed combined IaC solution;
    performing a policy check to determine that the signed IaC solution conforms to one or more policies;
    performing an automated validation of the signed IaC solution to check for one or more compliance or security issues;
    performing a signature check of the signed IaC solution to determine that the signed IaC solution has not been tampered with;
    determining that the signed IaC solution is authorized to be deployed by checking a trusted profile;
    validating one or more configuration parameters; and
    executing the signed IaC solution using the one or more configuration parameters to deploy cloud resources.

2. The computer-implemented method of claim 1, wherein the signed combined IaC solution comprises a combination of the signed public IaC solution and the signed private IaC solution.

3. The computer-implemented method of claim 1, comprising further operations for:
    under control of a public catalog:
        receiving the signed public IaC solution;
        performing another automated validation of the signed public IaC solution;
        performing another signature check of the signed public IaC solution; and
        in response to the signed public IaC solution being approved based on the automated validation and the signature check, storing the signed public IaC solution as an approved IaC solution in the public catalog.

4. The computer-implemented method of claim 1, comprising further operations for:
    under control of a private catalog:
        receiving the signed private IaC solution;
        performing another automated validation of the signed private IaC solution;
        performing another signature check of the signed private IaC solution; and
        in response to the signed private IaC solution being approved based on the automated validation and the signature check, storing the signed private IaC solution as an approved IaC solution in the private catalog.

5. The computer-implemented method of claim 1, comprising further operations for:
    displaying a plurality of approved IaC solutions;
    receiving selection of an approved IaC solution from the plurality of approved IaC solutions;
    receiving authorization to execute the selected, approved IaC solution; and
    executing the selected, approved IaC solution to deploy new cloud resources.

6. The computer-implemented method of claim 1, wherein a public catalog, a private catalog, a secure deployment agent, and a target account form a secure IaC solution pipeline.

7. The computer-implemented method of claim 1, comprising further operations for:
    determining that a new, signed IaC solution is not authorized to be deployed by checking the trusted profile; and
    returning a message that the resources will not be deployed.

8. A computer program product, the computer program product comprising a computer readable storage medium having program instructions embodied therewith, the program instructions executable by a processor to cause the processor to perform operations for:
    receiving a signed Infrastructure as Code (IaC) solution, wherein the signed IaC solution is selected from a group consisting of a signed public IaC solution, a signed private IaC solution, and a signed combined IaC solution;
    performing a policy check to determine that the signed IaC solution conforms to one or more policies;
    performing an automated validation of the signed IaC solution to check for one or more compliance or security issues;
    performing a signature check of the signed IaC solution to determine that the signed IaC solution has not been tampered with;
    determining that the signed IaC solution is authorized to be deployed by checking a trusted profile;
    validating one or more configuration parameters; and
    executing the signed IaC solution using the one or more configuration parameters to deploy cloud resources.

9. The computer program product of claim 8, wherein the signed combined IaC solution comprises a combination of the signed public IaC solution and the signed private IaC solution.

10. The computer program product of claim 8, wherein the program instructions are executable by the processor to cause the processor to perform further operations for:
    under control of a public catalog:
        receiving the signed public IaC solution;
        performing another automated validation of the signed public IaC solution;
        performing another signature check of the signed public IaC solution; and
        in response to the signed public IaC solution being approved based on the automated validation and the signature check, storing the signed public IaC solution as an approved IaC solution in the public catalog.

11. The computer program product of claim 8, wherein the program instructions are executable by the processor to cause the processor to perform further operations for:

under control of a private catalog:
receiving the signed private IaC solution;
performing another automated validation of the signed private IaC solution;
performing another signature check of the signed private IaC solution; and
in response to the signed private IaC solution being approved based on the automated validation and the signature check, storing the signed private IaC solution as an approved IaC solution in the private catalog.

12. The computer program product of claim 8, wherein the program instructions are executable by the processor to cause the processor to perform further operations for:
displaying a plurality of approved IaC solutions;
receiving selection of an approved IaC solution from the plurality of approved IaC solutions;
receiving authorization to execute the selected, approved IaC solution; and
executing the selected, approved IaC solution to deploy new cloud resources.

13. The computer program product of claim 8, wherein a public catalog, a private catalog, a secure deployment agent, and a target account form a secure IaC solution pipeline.

14. The computer program product of claim 8, wherein the program instructions are executable by the processor to cause the processor to perform further operations for:
determining that a new, signed IaC solution is not authorized to be deployed by checking the trusted profile; and
returning a message that the resources will not be deployed.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
receiving a signed Infrastructure as Code (IaC) solution, wherein the signed IaC solution is selected from a group consisting of a signed public IaC solution, a signed private IaC solution, and a signed combined IaC solution;
performing a policy check to determine that the signed IaC solution conforms to one or more policies;
performing an automated validation of the signed IaC solution to check for one or more compliance or security issues;
performing a signature check of the signed IaC solution to determine that the signed IaC solution has not been tampered with;
determining that the signed IaC solution is authorized to be deployed by checking a trusted profile;
validating one or more configuration parameters; and
executing the signed IaC solution using the one or more configuration parameters to deploy cloud resources.

16. The computer system of claim 15, wherein the signed combined IaC solution comprises a combination of the signed public IaC solution and the signed private IaC solution.

17. The computer system of claim 15, wherein the operations further comprise:
under control of a public catalog:
receiving the signed public IaC solution;
performing another automated validation of the signed public IaC solution;
performing another signature check of the signed public IaC solution; and
in response to the signed public IaC solution being approved based on the automated validation and the signature check, storing the signed public IaC solution as an approved IaC solution in the public catalog.

18. The computer system of claim 15, wherein the operations further comprise:
under control of a private catalog:
receiving the signed private IaC solution;
performing another automated validation of the signed private IaC solution;
performing another signature check of the signed private IaC solution; and
in response to the signed private IaC solution being approved based on the automated validation and the signature check, storing the signed private IaC solution as an approved IaC solution in the private catalog.

19. The computer system of claim 15, wherein the operations further comprise:
displaying a plurality of approved IaC solutions;
receiving selection of an approved IaC solution from the plurality of approved IaC solutions;
receiving authorization to execute the selected, approved IaC solution; and
executing the selected, approved IaC solution to deploy new cloud resources.

20. The computer system of claim 15, wherein the operations further comprise:
determining that a new, signed IaC solution is not authorized to be deployed by checking the trusted profile; and
returning a message that the resources will not be deployed.

* * * * *